US011275625B2

(12) United States Patent
Gómez et al.

(10) Patent No.: US 11,275,625 B2
(45) Date of Patent: *Mar. 15, 2022

(54) SYSTEM AND METHOD FOR AUTOMATED APPLICATION PROGRAMMING INTERFACE GENERATION

(71) Applicant: Kleeen Software Inc., San Jose, CA (US)

(72) Inventors: Aarón Gómez, Uruca (CR); Edison Romero, Tibás (CR); Joshua Hailpern, San Jose, CA (US); Mario Octavio Jiménez, Alajuela (CR); Jorge Ramírez, San Jose (CR)

(73) Assignee: Kleeen Software, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/600,358

(22) Filed: Oct. 11, 2019

(65) Prior Publication Data

US 2021/0026710 A1 Jan. 28, 2021

Related U.S. Application Data

(63) Continuation-in-part of application No. 16/569,553, filed on Sep. 12, 2019.

(60) Provisional application No. 62/794,446, filed on Jan. 18, 2019.

(51) Int. Cl.
*G06F 9/44* (2018.01)
*G06F 9/54* (2006.01)
*G06F 9/451* (2018.01)
*G06F 8/38* (2018.01)

(52) U.S. Cl.
CPC .............. *G06F 9/54* (2013.01); *G06F 8/38* (2013.01); *G06F 9/451* (2018.02)

(58) Field of Classification Search
None
See application file for complete search history.

(56) References Cited

U.S. PATENT DOCUMENTS

| 7,761,848 | B1* | 7/2010 | Chaffin | G06F 8/20 717/116 |
| 7,886,284 | B2* | 2/2011 | Haven | G06F 11/36 717/138 |
| 2016/0085662 | A1* | 3/2016 | Huang | G06F 11/3668 717/124 |
| 2019/0004927 | A1* | 1/2019 | Yang | G06F 16/2452 |
| 2019/0132410 | A1* | 5/2019 | Kuzkin | H04L 67/2809 |
| 2020/0081692 | A1* | 3/2020 | Multerer | G06F 3/0482 |

\* cited by examiner

*Primary Examiner* — Anna C Deng
(74) *Attorney, Agent, or Firm* — Rutan & Tucker, LLP; Kyle M. St. James (57) ABSTRACT

A computer-implemented method that includes receiving source code for a user interface program, generating, using the source code, the user interface program, generating, using the source code, a faux backend program, and generate, using the source code, a skeleton Application Programming Interface (API) file is disclosed. The user interface program and the faux backend program are capable of operating together as part of a test build. The skeleton API data provides a specification for an interface of production software suitable for replacing the faux backend, the specification including respective specifications for a plurality of API calls.

14 Claims, 4 Drawing Sheets

Table 1

| \multicolumn{3}{c}{KAPI Call Components} | | |
|---|---|---|
| Name | Description | required |
| Unique ID | programmer-supplied unique identifier for the Call | yes |
| Return Data Parameter | a KAPI Call Data parameter (see Table 2) for the data returned by the call | yes |
| Input Data Parameters | a list of KAPI Call Data parameters (see Table 2) for the data provided to the call | No |
| Refresh Time | time value (e.g. integer) | No |
| Real-Time Update | list of event emitters that trigger pulling data using, for example, a web socket | No |

FIG. 3

Table 2

| KAPI Call Data Parameter Components | | | |
|---|---|---|---|
| Parameter | Description | Examples | required |
| Data Meaning | e.g. string | "first name," "last name," "country," "birth date," "time sent," "Host Address," "Salary," "Length," "InventoryCount," "ARRAY of [ X, Y, Z ]" | yes |
| Data Format | predefined data format indicator | variable_length_string, fixed_length_string, Date, Timestamp, IPv4_Address, IPv6_Address CurrencyAmount, floating_point_number, integer, unsigned_integer, custom data type | yes |
| Permitted values | List of <Data Format> values | { 2, 3, 5, 7 }, { "N", "E", "S", "W" } | no |
| Permitted Range | pair of <Data Format> values | ( 0, 255 ), ( "01/01/2000", "12/31/2099" ) | no |
| Array Offset | amount to automatically update index into an array by | any signed integer | no |

SYSTEM AND METHOD FOR AUTOMATED APPLICATION PROGRAMMING INTERFACE GENERATION

CROSS-REFERENCE TO RELATED APPLICATION

This application is a continuation-in-part of U.S. application Ser. No. 16/569,553, filed Sep. 12, 2019, which claims the benefit of US Provisional Application No. 62/794,446, filed Jan. 18, 2019, the entire contents of both are incorporated herein by reference.

FIELD

The technology described herein relates generally to software development. More particularly, one embodiment of the technology relates to automated generation of computer software components, such as Application Programming Interfaces (APIs), that operate to provide an interface between software components, typically during the development process.

GENERAL BACKGROUND

User Interfaces (UIs) or Frontends are predicated on the ability of a backend (or backends in the case of a multi-backend system) (for example, a database) to get data (from the database) to the frontend (UI) using the middleware (such as may be expressed through Application Programming Interfaces (APIs)). While this may seem straight forward, the development process typically is not.

A typical development process might begin with the Project Management (PM) team defining what a new feature must do. The backend team does not have the data the PM team wants ready, so they guess at what the data (and the format of the data) will look like, how much data the PM team will have, and the best technology to provide that data.

Based on this guess, the middleware team (which in some cases is part of the backend team) make a mock API output file. The mock API output file is a static file that is not a real API, and includes mainly stand-in data and fake formatting (in, for example, JavaScript Open Notation (JSON)) according to the middleware teams best guesses based on the best guesses from the backend team, and the outlined specification from the PM team.

After receiving the mock API output file, the UI team then guesses what the API calls will look like, and starts coding the UI based on the faux data and formatting in the mock API output file. While the UI team is working, the backend team works to refine their guess as to what the data and its formatting actually are, and revises the mock API output file accordingly.

Every time the backend team revises the mock API output file, the UI team needs to change their code. In some cases this only involves how the UI code parses the data, but at worst, this involves changing the UI itself because of changes in what data exists or the contents of the data being different than in the previous iteration of the mock API file.

Further complicating the situation, the mock API output file is often not updated every time the data changes, and as a result the UI team is often working with out of date information.

Adding more complication, the UI team often finds they need additional data to complete the UI as specified, and thus are blocked as the await middleware and backend teams to update their side of the collaboration, so as to finish their UI work.

Eventually, once the backend team believes they have the data and how to extract it defined, the middleware team starts finalizing the API structure. As the middleware team changes the AP Is, the UI team must also change their code to pull data the right way.

To further protect the front end from breaking, the UI team must put in tests to make sure that the data they intend to get (e.g. Integer, string, IP address) actually is what the API returns (and no errors or Unicode problems arise). Otherwise the backend breaks. Often those tests are forgotten, or not complete, which results in a broken product, and the UI team must fix the front end, and/or the middleware/backend team must figure out why they sent bad data to the front end.

This shortcomings of this process can add months and man hours to a project as well as introduce considerable opportunities for human error. Accordingly, a better way to define an API used by software that provides a UI is desirable.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Certain embodiments and examples are disclosed herein; however, the disclosure is not intended to be so limited and the inventive concept naturally extends beyond the specific recited embodiments. As a result, the scope of the claims should not be limited by any particular embodiment described herein. For instance, with respect to any method or process discussed below, the operations of the method or process can be performed in any suitable order and/or may be optional.

I. Overview Summary

Currently, when a frontend (e.g., a user interface and the components necessary to display the UI) of a software product needs to retrieve data from a backend (e.g., data stored in a database/data store or calls to hardware components), an API is created. The term "software product" may refer to any computer program or application, which typically includes a user interactive aspect (e.g., a website, a computer program, an application ("app") for a mobile device, etc.). During development of the software product, when either the frontend or the backend changes, the other component needs to change as well to maintain the ability for the frontend to query the backend.

For example, when the frontend changes, the API needs to be modified in order to enable communications between the frontend and backend. Specifically, the API needs to be modified in order to request new data (or a modified data type) based on changes to the frontend. If performed manually, such a process of modifying the API decreases the efficiency and speed of a software development team as those working on developing the frontend are unable to proceed and test their source code without a working, updated API that properly requests the updated data. Similarly, software developers working on developing the backend may need to revise a substantial portion of the backend based on the updated data required by the frontend. Additionally, such revising leaves the software product open to errors such as incorrectly written instructions or computer code.

The invention of the disclosure provides an automatically generated API (or set of APIs), which enables the frontend and the backend to be developed independently of each other. The system and method disclosed below describe logic and operations that receive user input including specific requirements of data that will be utilized by a frontend (e.g., data types, structure, formatting). Based on the user input, the system and method automatically generate: (i) one or more APIs, and (ii) a "faux" backend that includes data satisfying the requirements of the user input. Data populating the "faux" backend may be randomly generated and satisfy the requirements of the user input. Therefore, as the frontend is developed, testing of the frontend may utilize the automatically generated APIs to retrieve data from the "faux" backend; thus, guaranteeing the frontend receives data that complies with the required data structure or format.

Additionally, the automatically generated APIs provide guidance in terms of data structure and formatting required by the frontend. As a result, the backend may be developed in accordance with the requirements of the frontend. As one technical advantage provided by the system and method, the automatically generated APIs and the "faux" background enable continued development and testing of the frontend without the need to wait for revision of the backend. Therefore, the invention of the disclosure provides an improvement to the field of computer software development by automatically the process of generating one or more APIs; thereby, improving the efficiency and accuracy of the software development process. The technical particulars to accomplish the automated API generation are described below.

With reference to exemplary embodiments, certain embodiments include a computer-implemented method comprising receiving information, such as entry files that may include source code for a user interface program and source code for an automated Application Programing Interface (API) generator, generating, using the source code, the user interface program, generating, using the source code, a faux backend program, and generating, using the source code, skeleton API data. In some embodiments, the entry files may include source code as well as configuration data. The configuration data may be one or more files and/or data that is entered into a data store. Additionally, the source code may be comprised of several text files that are parsed as one of more operations of the computer-implemented method.

As used herein, the term "faux backend program" may refer to API data (e.g., one or more files or data stored in a data store) that provides exposure to certain data. The data accessible by the faux backend program may be automatically generated during performance of the computer-implemented method based on predefined data structures (e.g., organization of the data). For example, the structure of the data is predefined, but the data itself may be randomized text, special characters, images or otherwise that adhere to the requisite predefined structure. One purpose of the faux backend program is to enable development and testing of the user interface program without having actual data for the user interface program to retrieve and display. Instead, the faux backend program automatically generates data having predefined structure and stored in a data store that is accessible by the user interface program. As noted, the faux backend program may the form of one or more text files, such as a JavaScript® Object Notation (JSON) file, a JavaScript® file, or the like.

In some embodiments, the following operations may be performed during the generation of the faux backend program. A parsing operation is performed on the configuration data and an extraction operation extracts one or more entities defined therein. The method continues with a population operation causing population of a data store with randomly generated data adhering to the entities (e.g., structural requirements such as format, data type, file type, etc.) extracted from the configuration data. Upon populating a data store with data adhering to the structural requirements, one or more API endpoints are set to be the location of the data store, thereby enabling access to the data by the user interface program. In one example, an API endpoint is a location identifier (e.g., a URL) of the data store.

As one illustrative example, generating the faux backend program may include an operation of receiving entity data that defines the plurality of API entities (e.g., a file or data that is stored in a data store). The entity data may include, but is not limited or restricted to (i) a name for each entity and (ii) properties that are related to that entity. For instance, an API entity may be named "users", and the properties of that entity may include: a "first name" (data meaning) with a data format of "string"; and "last login" (data meaning) with a data format of "timestamp." The entity data is then parsed during generation of the randomized data (e.g., so that such data adheres to the required structure of the entity API, which is populated in a data store with the corresponding data types/formats. The quantity of data populating the data store may be specified in the entity data.

The user interface program and the faux backend program are capable of operating together as part of a test build (e.g. usage for a demo, user feedback, experimentation, debugging, etc.). The skeleton API data provides a specification for an interface of production software suitable for replacing the faux backend, the specification including respective specifications for a plurality of API calls. In an embodiment, the source code for the user interface program includes the plurality of API calls, and the skeleton API data is generated using the plurality of API calls. As used herein, the term "skeleton API data" may refer to a specification, such as a set of rules for example, that defines how an API is to be structured in order to interact with the user interface program. For instance, the skeleton API data may comprise a listing of API endpoints at which data is stored and may specify a data structure for each API entity. In one embodiment, the skeleton API data may be a JSON file or another type of JavaScript® file, other text file and/or data stored in a data store. In some embodiments, the skeleton API data may include one or more of the following (although all need not be present): (i) a name corresponding to each API entity, (ii) a description of each API entity, (iii) a listing of HyperText Transfer Protocol (HTTP) request methods that each API entity supports, and (iv) a set of properties for each API entity. The set of properties for each API entity may include the name of the property, a description of the property, the primitive type (e.g., number, string, etc.), a custom (predefined) type (e.g., IP address, country, phone number, timestamp, other entity), and/or an indication as to whether the property is a required property for the given API entity. For example, when a custom type "country" entity is included within the skeleton API data, the generation of randomized data discussed above will include a plurality of text strings each being a country (e.g., Costa Rica, United States, Mexico, etc.). Therefore, when the user interface program receives user input to select a country, the text strings may be displayed via the user interface program as user-selectable options or suggestions. In some embodiments, the skeleton API data may be stored on a data store, which may be accessible over a network such as the internet. In some embodiments, the term "API entity" is also referred to as an "API call."

In some embodiments, the following operations may be performed during the generation of the skeleton API data. Upon receiving the configuration data, a parsing operation is performed on the configuration data and an extraction operation is performed resulting in the extraction of each API entity. A population operation is then performed causing population of a data store with each entity including the data discussed above. Upon execution, the user interface program accesses the data stored by the faux backend program via APIs as set forth in the skeleton API data. The automatically generated data referenced above is stored in a data store and access to the data is via the faux backend program, which is an API that adheres to the rules/specification of the skeleton API data. In some embodiments, a default location for storage of the skeleton API data is predetermined. Therefore, unless an alternative location is provided via user input logic performing the operations discussed herein retrieves the skeleton API data at a default location.

In an embodiment, the plurality of API calls each include a plurality of API call components, the plurality of API call components comprising a unique identifier call component and a data parameter call component corresponding to data returned by the call.

In an embodiment, the plurality of API call components further comprises a real-time update call parameter, a refresh time call parameter, one or more data call parameters corresponding to data provided to the call, or combinations thereof.

In an embodiment, the data call parameter comprises a data meaning component and a data format component. In an embodiment, the data call parameter further comprises a permitted values component, a permitted range component, an array offset component, or combinations thereof.

In an embodiment, the method may include an operation of generating, using the skeleton API data, tests that validate the data parameters of the API calls, and the tests may be included in the user interface program. When the faux backend program is disabled and an alternative backend is enabled, one or more tests may be activated to validate the structure of the API entities of the alternative backend. For example, a comparison of the API entities of the alternative backend against the skeleton API data may be performed to ensure the structural requirements are met.

In an embodiment, the computer-implemented method further comprises generating the test build based, at least in part, on the operability and use(e.g., calling) of the user interface program with the faux backend program. In one example embodiment, when a test build is utilized during testing, warning and error messages will popup when the alternative backend is providing data that does not comply with the skeleton API data. However, with a production build, such warnings and error messages (and the tests or checks that result in warnings or errors) should be disabled. Thus, the logic modules (e.g., shown in FIG. 5) and the data received and generated including such tests may be referred to as a "test build." The test build may also enable (or disable the faux backend program) by providing links (such as API endpoints) to the faux backend program or to alternative links (such as to a database storing user obtained data). The logic modules (e.g., shown in FIG. 5) and the data received and generated when such tests are not included (e.g., no checks or tests performed on retrieved data) may be referred to as a "production build."

In an embodiment, the computer-implemented method further comprises receiving a production program having an API that complies with the skeleton API data, and generating a production build based, at least in part, on the operability and use (e.g., calling) of the user interface program with the production program (also referred to as the "user interface program").

In an embodiment, the production program comprises a middleware program developed using the skeleton API data and having an API that complies with the skeleton API data and a backend program. The middleware program implements the plurality of API calls of the skeleton API data using one or more backend function calls of the backend program.

Embodiments include a non-transitory computer readable media comprising computer programming instructions that when executed cause a computer to perform: receiving source code for a user interface program, generating, using the source code, the user interface program, generating, using the source code, a faux backend program, and generate, using the source code, a skeleton Application Programming Interface (API) file. The user interface program and the faux backend program are capable of operating together as part of a test build. The skeleton API data provides a specification for an interface of production software suitable for replacing the faux backend, the specification including respective specifications for a plurality of API calls.

The interface of production software is an API that adheres to the requirements defined in the skeleton API data. In some embodiments, the interface of the production software is predefined and received as user input. In some embodiments, "replacing the faux backend" may refer to disabling of access to data via the faux backend program. Access to the data via the faux backend program may also be enabled.

As one example, when two APIs are being developed, e.g., a "users" API and a "products" API. Data may be collected for the "users" API from http://your-site.com/users, and data may be collected for the "products" API from http://your-other-site/products. The system and method disclosed here automatically generates one or more APIs (e.g., the "users" API and the "products" API) without required data to be available at the links above for either the "users" API or the "products" API (e.g., the data is not "production ready"). The automatic generation of the one or more APIs is performed based on the description (e.g., structure) of the data that will be utilized by the "users" API and the "products" API. The system and method generates the APIs based on a predetermined structure for each API and provides a user interface program access to the APIs. Therefore, development of the user interface program is not stalled as testing may be performed using the automatically generated APIs. Additionally, once one or more actual APIs are developed (e.g., by a software development team), the system and method provide the user interface program, through configuration details, access to the actual API (e.g., the "users" API) while the user interface program continues to access the automatically generated API (e.g., the "products" API) until that actual API is generated by the software development team.

Another example may be where there are two or more backend systems from which data is being requested. Data for the "users" API is at http://site-A.com/users, and data for "products" API from http://site-B.com/products. The system allows a human or other system to connect the two data streams into one API call as specified by the generated API skeleton file, following the format and data content specifications.

In an embodiment, the non-transitory computer readable media further comprising computer programming instructions that when executed cause the computer to perform generating, by combining the user interface program with the faux backend program, the test build.

In an embodiment, the non-transitory computer readable media further comprising computer programming instructions that when executed cause the computer to perform receiving a production program having an API that complies with the skeleton API data, and generating, by combining the user interface program with the production program, a production build.

II. Terminology

In the following description, certain terminology is used to describe various features of the invention. For example, each of the terms "logic," "engine," and "component" may be representative of hardware, firmware or software that is configured to perform one or more functions. As hardware, the term logic (or component) may include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the logic (or component) may include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

The term "computerized" generally represents that any corresponding operations are conducted by hardware in combination with software and/or firmware.

The term "network device" may be construed as any electronic computing system with the capability of processing data and connecting to a network. Such a network may be a public network such as the Internet or a private network such as a wireless data telecommunication network, wide area network, a type of local area network (LAN), or a combination of networks. Examples of a network device may include, but are not limited or restricted to, an endpoint (e.g., a laptop, a mobile phone, a tablet, a computer, etc.), a standalone appliance, a server, a router or other intermediary communication device, a firewall, etc.

The term "rules" refers to logic used in for performing various operations, each capable of being represented as a logical expression for example, such as an "if this, then that" statement, where "this" represents a condition, and "that" represents the conclusion.

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. Illustrative Embodiments

Embodiments relate to software development. In particular, embodiments relate to processes and products for improving the speed and efficiency of authoring software that provides user interfaces, and the quality and reliability of that software.

Figure 1A:
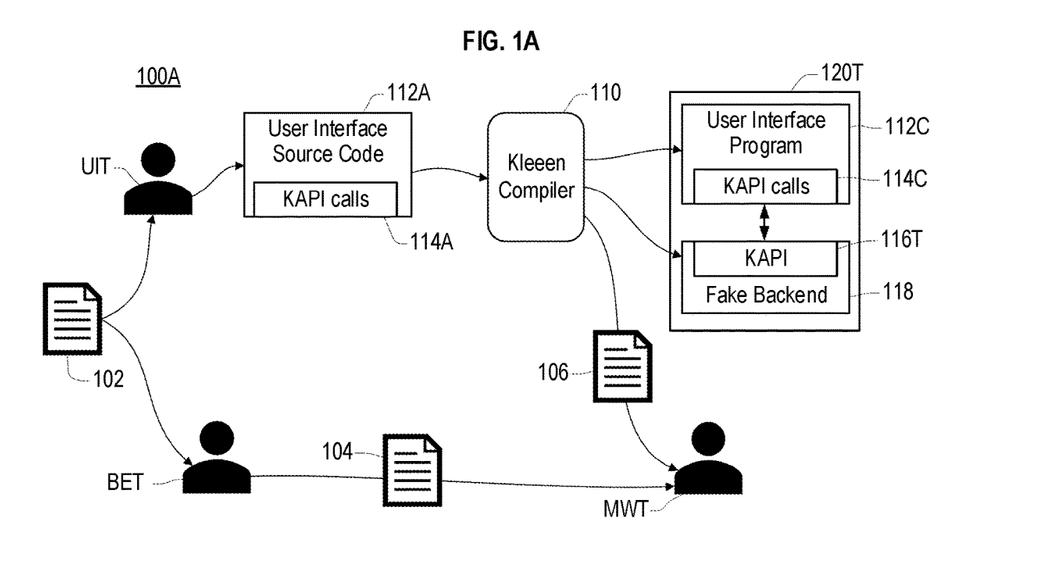
FIG. 1A illustrates a development phase of a User interface (UI) authoring process according to an embodiment of the disclosure.

FIG. 1A illustrates a development phase 100A of a User Interface (UI) authoring process according to an embodiment. The development phase may involve a UI Team UIT, a Backend (BE) Team BET, and a Middleware (MW) Team MWT, each comprising one or more developers. In some cases, a developer may be a member of more than one of the Teams. In some cases, functions of two teams may be performed by a single team.

The development phase 100A begins with the providing of a product specification 102 to the UI Team UIT and the BE Team BET. The product specification 102 describes the features of the product that the teams are to build.

The UI Team UIT authors UI Source Code 112A that, when compiled into machine-executable instructions, will provide a UI on a suitable computing device. The UI Source Code 112A may be included in a non-transitory computer-readable medium. The UI will provide a UI to the product specified by the product specification 102, through which UI a user will be able to access and manipulate data stored in a backend.

The UI Team UIT authors UI Source Code 112A to include Kleeen API (KAPI) calls 114A. The UI Source Code 112A uses the KAPI calls 114A to specify accesses and manipulations of the data stored in the backend. In embodiments, the KAPI calls 114A are the exclusive means by which the UI Source Code 112A specifies the accesses and manipulations to be performed on the data stored in the backend. The KAPI calls 114A may specify calls to a KAPI service.

Each call of the KAPI calls 114A includes information about the data being accessed. The information may include the format for storing the data (e.g., Boolean, unsigned integer, signed integer, floating point number, fixed-length string, variable-length string, etcetera), the meaning of the data (e.g. first name, city name, country name, country code, date, time, currency denomination, IP address, ARRAY of [X, Y, Z], etc.), permissible values for the data, permissible ranges for the data, and so on, and combinations thereof. In an embodiment, the information about the data may be provided in JavaScript® Object Notation (JSON), eXtensible Markup Language (XML), or the like.

At any time during the development phase 100A, the UI Team UIT may compile (or in some embodiments, compile and link) the UI Source Code 112A using a Kleeen compiler 110 (that is, a compiler designed to produce, inter alia, the KAPI call code sequences 114C from the KAPI calls 114A). The Kleeen compiler 110 may produce three outputs: a UI Program 112C, a Fake BE 118, and a skeleton API data 106, each of which may be included in a non-transitory computer-readable medium. In an embodiment, the Kleeen compiler 110 may include a preprocessor that processes the KAPI calls 114A for compilation by a compiler of the related art, such as a C compiler, C++ compiler, a Java complier, and so on. In an embodiment, the Kleeen compiler 110 may processes the KAPI calls 114A into a front-end web framework such as Angular or React. In embodiments, the Kleeen compiler 110 may be web based, such as a web-based Software as a Service (SaaS).

The UI Program 112C may include, among other things, computer programing instructions that when executed by a computer provide a UI in accordance with the UI Source Code 112A. The UI Program 112C includes code sequences 114C that perform KAPI calls.

The Fake BE 118 may include, among other things, computer programing instructions that when executed by a computer provide a test KAPI service 116T that may be called by the code sequences 114C that perform KAPI calls. The data provided by the test KAPI service 116T is generated by the Fake BE 118 according to the information about the data included in all of the KAPI calls 114A included in the UI Source Code 112A.

When linked together, the UI Program 112C and the Fake BE 118 form a test build 120T of the product being authored. The test build 120T presents and allows exercising of the UI coded in the UI Source Code 112A using fake data provided by the Fake BE 118, wherein the fake data conforms to the information provided about it in the KAPI calls 114A. For example, if the data for a field in the UI is identified in a KAPI call as being a date, the value returned by the KAPI call will be a valid date. In embodiments, fake data may have values that follow a probabilistic distribution specified by a developer. In embodiments, the probabilistic distribution may be a normal distribution, a Poisson distribution, a binomial distribution, an exponential distribution, or the like. For example, fake data for provided by the Fake BE 118 for one parameter might be whole numbers from 1 to 100 in a bell curve centered at 36. In another example, fake data provided by the Fake BE 118 for another parameter might be fruit names having a logarithmic distribution so that some fruit names occur more often than others.

Figure 1B:
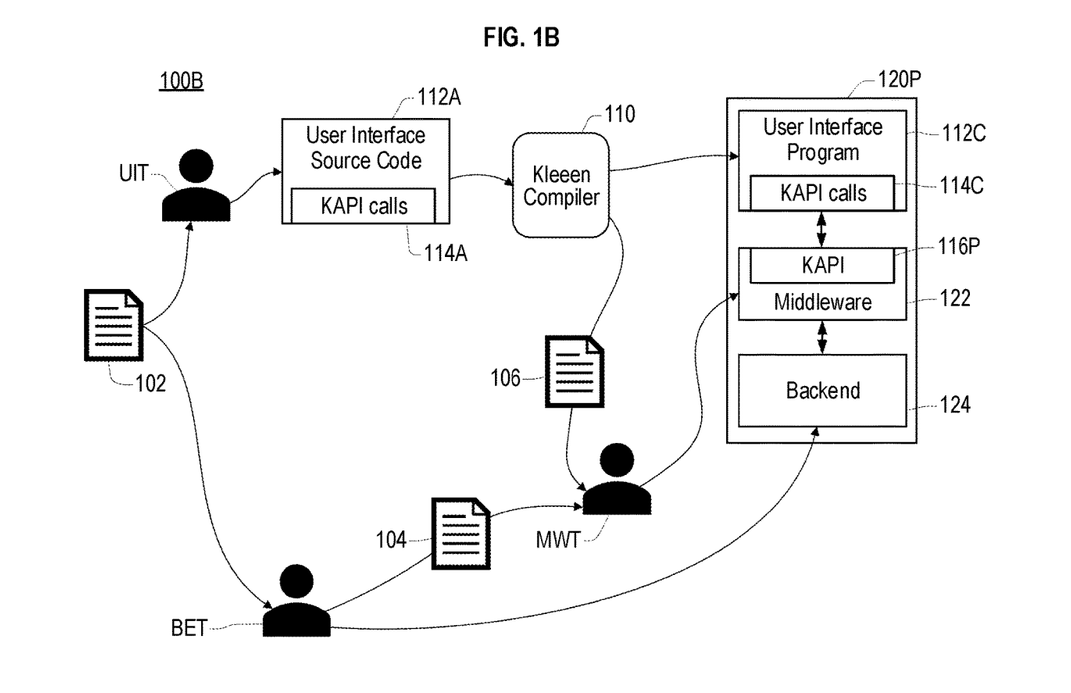
FIG. 1B illustrates a production phase of a User interface (UI) authoring process according to an embodiment of the disclosure.

The data used to populate the Fake BE 118 may be exported to a different database system, and in particular to a database system of the type that will be used in a production build described in FIG. 1B. This allows the BE Team BET to more easily create a test database for testing the production build.

The UI Team UIT may use the test build 120T to determine if the UI Source Code 112A is providing a UI according to the product specification 102, and may revise the UI Source Code 112A according to what they learn by evaluating the test build 120T. Any number of compile-evaluate-revise cycles may be performed.

The UI Team UIT may also use the test build 120T to experiment with various options and configurations for the UI being provided, and to do Quality Assurance (QA) on the UI. The test build 120T may also be used to demonstrate the UI to a client.

Notably, neither the BE Team BET or the MW Team MWT is involved in or necessary for the creation of the test build 120T.

While the UI Team UIT is developing the test build 120T, the BE team BET may simultaneously be developing, based on the product specification 102, a production backend. In the course of developing the production backend, the BE Team BET may provide a backend interface specification 104 to the MW Team MWT. The BE team BET does not need to waste time making a mock API output file that might quickly become out-of-date, and the UI team can start upon receiving the production specification without waiting for the mock API output file.

The skeleton API data 106 produced by the Kleeen compiler 110 is a design document specifying the syntax and semantics of the interface to the KAPI service 116T. The skeleton API data 106 defines a plurality of API calls for the KAPI, including the formats and types of the parameters passed to each API call, and the return type and format of data returned by each API call.

In embodiments, the skeleton API data 106 may include abstract classes in Java, or could be a "dot-h" file in C. The skeleton API data 106 may be provided to the MW Team MWT for use in authoring middleware of a production build, as discussed with respect to FIG. 1B, below.

FIG. 1B illustrates a production phase 100B of a User Interface (UI) authoring process according to an embodiment. The production phase 100B may be a modification of the development phase 100A of FIG. 1A, discussed above.

Rather than building a test build 120T as in FIG. 1, the production phase 100B builds a production build 120P. The production build 120P includes the UI Program 112C, a middleware program 122, and a backend program 124. The production build 120P may be suitable for delivery to a client.

The UI Program 112C and the skeleton API data 106 are developed is disclosed in FIG. 1A.

The BE Team BET develops the backend program 124 according to the product specification 102, and may do so in parallel with the development of the UI Program 112C. The BE Team BET also develops the backend interface specification 104 and delivers it to the MW Team MWT. The backend interface specification 104 defines the interface to the backend program 124 as a plurality of backend function calls.

The MW Team MWT develops the middleware program 122 according to the skeleton API data 106 and the backend interface specification 104. The middleware program 122 implements each of the plurality of API calls for the KAPI defined by the skeleton API data 106 using one or more of the backend function calls defined in the backend interface specification 104.

In an embodiment, the UI Program 112C, the middleware program 122, and the backend program 124 are produced by separate compilations of their respective source code, and the outputs of those compilations linked together to create the production build 120P. In another embodiment, the UI Program 112C, the source code for the middleware program 122, and the source code for the backend program 124 are compiled together using the Kleeen compiler 110 to create the production build 120P.

In an embodiment, the middleware program 122 and the backend program 124 are included in a single program developed by a combined backend/middleware team.

One benefit of the development process described in FIGS. 1A and 1B is that if the backend program 124 or the interface to the backend program 124 changes, the UI team UIT is not affected, does not need to be notified, and does not need to change anything in the UI Source Code 112A. Instead, if there is a change introduced by the BE Team BET, the consequences of that change are dealt with by the BE Team BET, the MW Team MWT, or both.

When the production build 120P is needed, such as for shipping to a client, the teams simply switch out the fake backend 118 that was generated by the Kleeen compiler 110 for the middleware program 122 and the backend program 124 developed by the other teams. In embodiments, test suits for the UI developed using the fake backend 118 are used to test the production build 120P before shipment.

Figure 2:
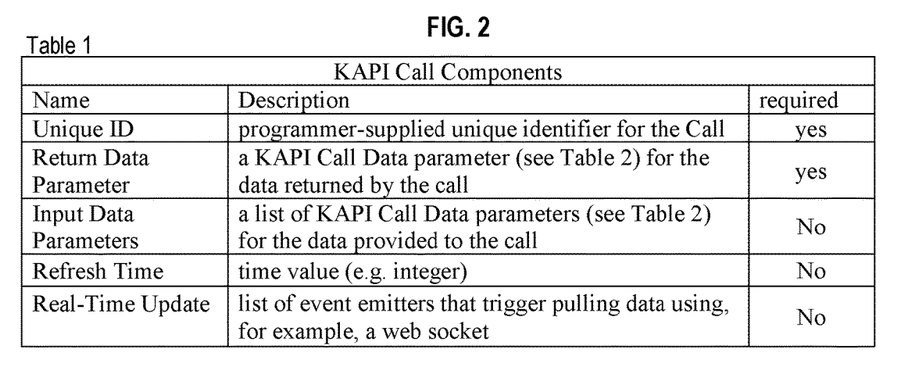
FIG. 2 shows a table of components of a Kleeen API (KAPI) Call, according to an embodiment of the disclosure.

FIG. 2 shows a Table 1 of components of a KAPI Call, according to an embodiment. The components are in addition to the identifier of the function being called. Some components are required, others are optional. The received configuration data discussed above, which may be received user input or obtained from storage, may include definitions for one or more API entities (e.g., API calls). In addition (or as an alternative) to the information discussed above that may be included in each API entity, FIG. 2 provides one illustrative example of such a definition.

A Unique ID must be supplied for every KAPI Call. This allows one KAPI call to satisfy multiple parts of the UI (by stuffing a ton of data inside that one call), which improves efficiency. Any UI element with a KAPI call can reference the last call a parent UI element made, when coding in the skeleton API data. As a result, UI elements can pull data from other KAPI calls, reducing the number of access to the backend.

In most embodiments, each KAPI Call includes Return Data Parameters. A KAPI Call may also have one or more Input Data Parameters, also as described with respect to FIG. 3.

A KAPI Call may optionally include a Refresh Time parameter. This allows the data for a UI element to be pulled at a regular interval from the backend, and the UI element updated with the new data. This can contain controls to pause, or change the timer programmatically (e.g. a UI element can change the refresh rate).

A KAPI Call may optionally include a Real-Time Update parameter. The Real Time Update parameter includes an indication of an event emitter or a list of indication of respective event emitters. Even emitters may correspond to a creation event, an update event, a deletion event, or a combination thereof.

When an event associated with an event emitter included in the Real-Time Update parameter occurs, data is pulled from the backend in response. This may be accomplished using, for example, a web socket. The UI element is then updated using the pulled data.

Figure 3:
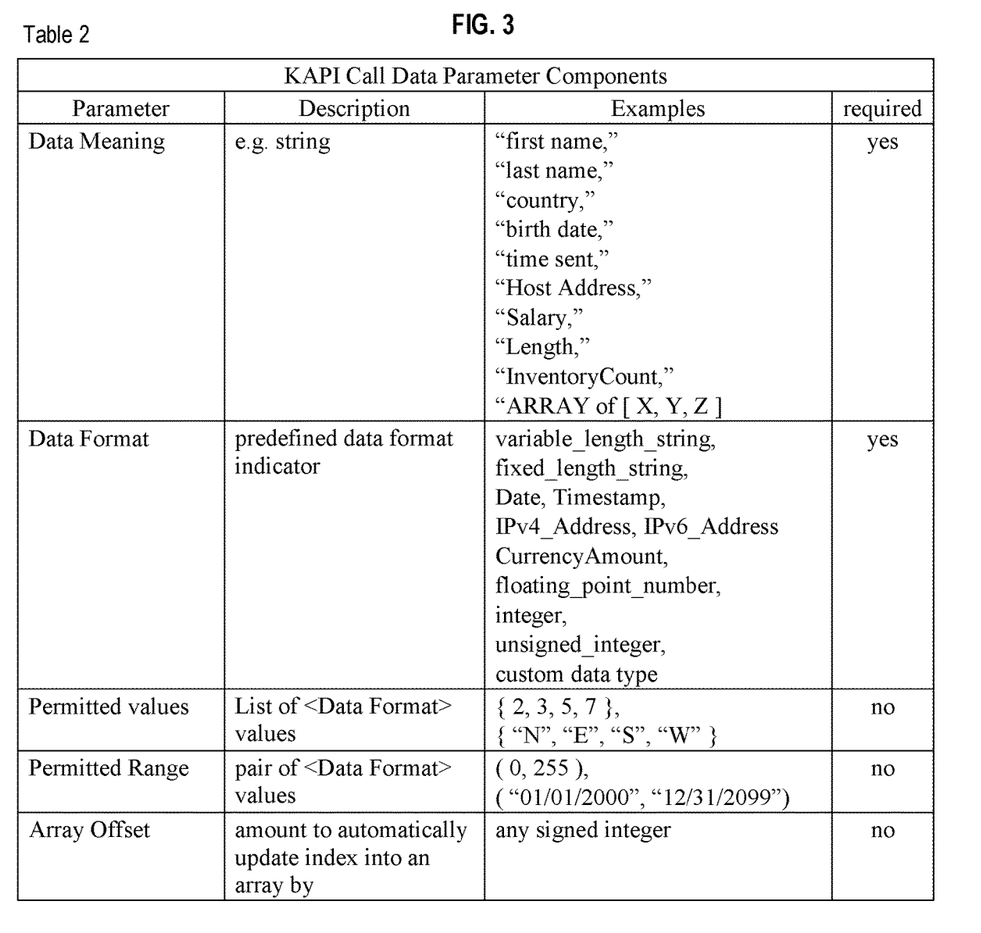
FIG. 3 shows a table of components of a KAPI Call Data Parameter, according to an embodiment of the disclosure.

FIG. 3 shows a Table 2 of components of a KAPI Call Data Parameter, according to an embodiment. Table 2 illustrates required and optional information that may be specified for a Return Data Parameter or an Input Data Parameter of a KAPI Call.

Each KAPI Call Data Parameter has a respective Data Meaning. The Data Meaning may be used as a key for accessing data in the backend. The Data Meaning may also be displayed in the UI as a label, pop-up hint, prompt, or the like. In embodiments, the Data Meaning is expressed as a string.

The Data Meaning may be an array. For example, the Data Meaning may be an "ARRAY of [First Name, Middle Initial, Last Name]."

Each KAPI Call Data Parameter has a respective Data Format. The Data Format corresponds to a predefined data type. In an embodiment, Data Format is indicated using a predefined constant value. In another embodiment, Data Format is indicated using a string. When the Data Meaning is an ARRAY, the Data Format corresponds to the data type of the elements of the ARRAY.

The Data Format may be a custom data type. The custom data type may be defined in a JSON file and referred to using symbolic names defined in the JSON file.

A KAPI Call Data Parameter may optionally have a Permitted Values indication. In an embodiment, the Permitted Values indication may be a list of value of the Data Format type of the KAPI Call Data Parameter. In an embodiment, the Permitted Values indication may be data retrieved from the backend.

In embodiment, a Permitted Values indication may be a predetermined indication specific to the Data Format of the KAPI Call Data Parameter. For example, when the Data Format is an IPv4 Address, a Permitted Value indication may indicate a network size selected from {ANY, TYPE A, TYPE B, TYPE C} and contents of the network number bits of the specified size of network. In another example, when the Data Format is an IPv4 Address, a Permitted Value indication may indicate 4-byte network address mask and a 4-byte value including the permitted values of the bits masked by the network address mask.

A KAPI Call Data Parameter may optionally have a Permitted Range indication. In an embodiment, the Permitted Range indication may include a minimum value and a maximum value, each having the Data Format type of the KAPI Call Data Parameter. In an embodiment, the Permitted Range indication may be data retrieved from the backend.

Referring to FIGS. 1A and 1B, when UI Source Code including a KAPI Call 114A is compiled, the code sequences 114C generated by the compiler to the perform the KAPI call 114A may include one or more automatically generated tests to ensure that the Data Parameters of the KAPI Call are of the right format and within a valid range. The automatically generated tests for a Data Parameter may be based on the Data Format of the Data Parameter, a Permitted Values indication of the Data Parameter (if present), a Permitted Range indication of the Data Parameter (if present), or combinations thereof.

For example, tests generated from the Data Format may test whether currency amounts are integers or fixed-point numbers, IPv4 addresses are 4 numbers between 0 and 255 each separated by a dots, and so on. This allows for automated checks to prevent errors, without anyone having to manually code these checks. If the test fails, a list is generated detailing what the errors were. The list detailing the errors may then be presented or made available to the teams.

KAPI Call Data Parameter that has an ARRAY Data Meaning may optionally have Array Offset indication, that specifies an amount to increment or decrement an internal index of the array on each request. This simplifies the implementation of infinite scrolling or pagination. The UI Team UIT does not have to write code to manage the internal index, because the necessary code is generated by the KAPI compiler.

KAPI Calls can also have full-text query search to simplify global search functionality. It includes sorting, ordering and query operators (greater than, equal, etc.) to satisfy the maximum possible of data search queries. The endpoints will provide the functionality to parse the URL query parameters. Table 3, below, shows example of KAPI calls using full text query search.

TABLE 3

KAPI full-text query call examples.

```
GET /users?username=Borer Aylin
GET /users?username= Borer_ Aylin&address=some
GET /users?q=Ella
GET /users?username like=Borer
GET /users?username ne=Borer Aylin
GET /users?version gte=Borer Aylin
GET /users? sort=username& order=asc
GET /users? sort=username,device& order=asc,desc
```

In an embodiment, the UI Program 1 12C may be generated to include an Inspect mode. In Inspect Mode, when a UI element is selected (such as by a mouse click), a list of the KAPI generated APIs that are feeding that UI element may be displayed. The KAPI generated APIs that are feeding that UI element may be displayed in, for example, a pop-up menu. This allows the teams to better understand the context in which the KAPI generated APIs are being used.

Figure 4:
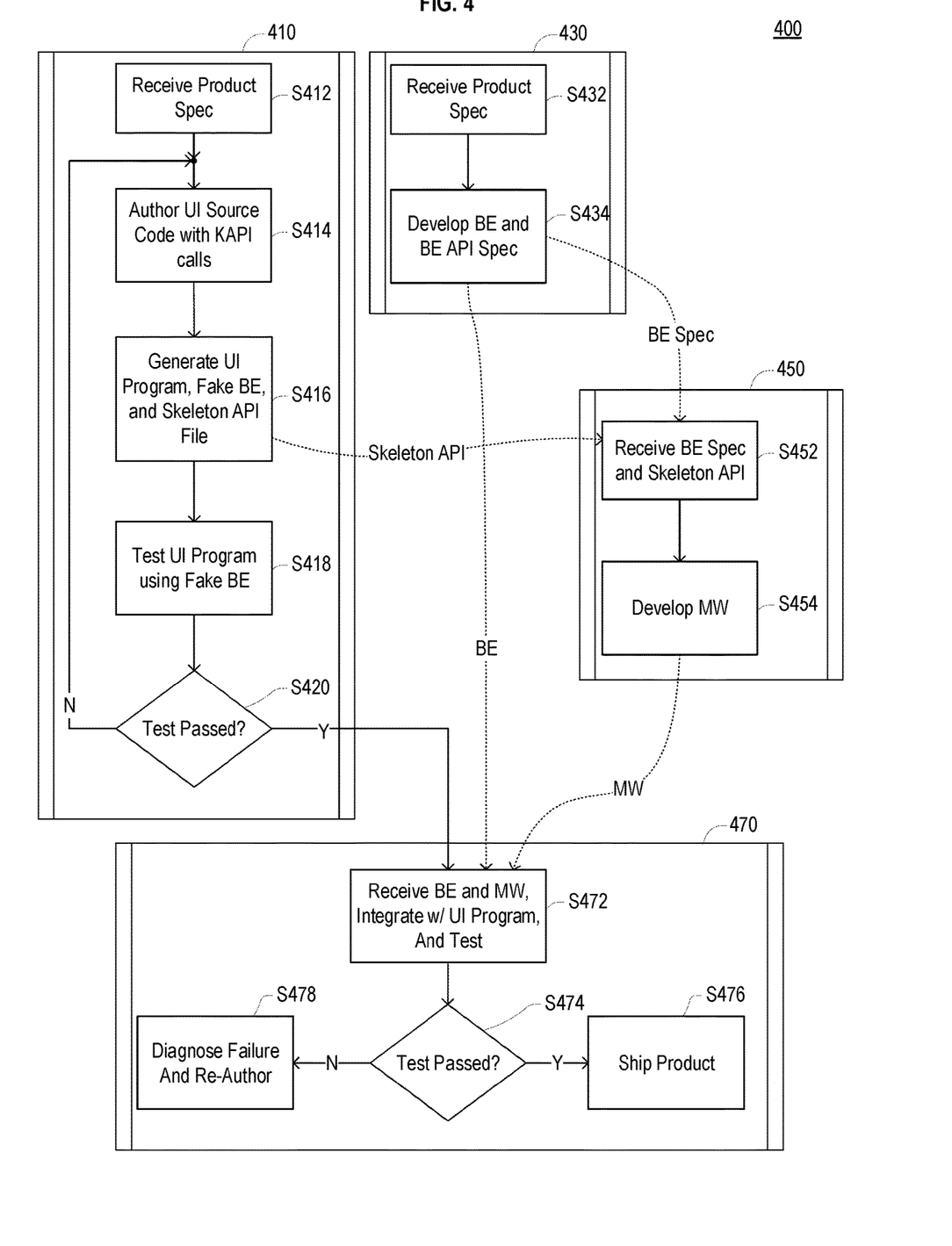
FIG. 4 illustrates a process for developing a product including a User Interface, according to an embodiment of the disclosure.

FIG. 4 illustrates a process 400 for developing a product including a User Interface, according to an embodiment. The process 400 includes a User interface (UI) development subprocess 410, a backend (BE) development subprocess 430, a middleware (MW) development subprocess 450, and a production build subprocess 470. Each of the subprocesses of the process 400 may be performed in parallel, subject to the availability of the required inputs for each.

In embodiments, each of the subprocesses of the process 400 may be performed by a team of developers using the appropriate computer-based software development tools, and some steps may be completely or partially automated. In embodiments, one or more of the subprocesses are completely automated. In the description below, details of operations that are widely known in the art are omitted in the interest of brevity.

The UI development subprocess 410 has only a single required input: a product specification. At S412, the UI development subprocess 410 receives the product specification.

At S414, the UI development subprocess 410 authors the UI source code. The UI source code includes Kleeen API calls, as described above.

At S416, the UI development subprocess 410 processes the UI source code to generate one or more of a UI program, a Fake BE, and Skeleton API data. The UI program, the Fake BE, and the Skeleton API file may be generated by a pre-processor, a compiler, a web-based service, or combinations thereof.

The UI program includes computer programing instructions for providing a user interface on a computer or a device including a computer. The UI program includes calls to a Kleeen API service that access data from a backend, code to present data on the UI, and code to receive data through the UI. The UI program may further include code that validates the data from the backend or received through the UI.

The Fake BE is a program that provides test data in response to calls to the Kleeen API service. The test data is of an appropriate format and has a valid value for the requested data. Accordingly, the Fake BE is suitable for testing the UI program.

The Skeleton API file includes information on the Kleeen API calls included in the UI source code. The information includes type, format, and other information regarding the parameters of each Kleeen API calls. The information may be expressed, for example, as a Java abstract class, in a markup language such as XML, or as a C "dot-h" file. The Skeleton API file may be provided to the MW development process 450.

At S418, the UI development subprocess 410 tests the UI program using the Fake BE.

At S420, the UI development subprocess 410 proceeds to S472 of the production build subprocess 470 if the tests performed at S418 passed; otherwise, at S420 the UI development subprocess 410 proceeds to S414 to continue development of the UI Source code.

The BE development subprocess 430, according to one embodiment of the disclosure, has only a single required input: the product specification. At S432, the BE development subprocess 430 receives the product specification.

At S434, the BE development subprocess 430 uses the product specification to produce a backend (BE) and a BE API specification. The backend may be provided to the production build subprocess 470. The BE API specification may be provided to the MW development subprocess 450.

The MW development subprocess 450 has two required inputs: the BE API specification and the Skeleton API file. At S452, the MW development subprocess 450 receives the BE API specification and the Skeleton API file. The BE API specification and the Skeleton API file can be received in any order.

At S454, the MW development subprocess 450 uses the BE API specification and the Skeleton API file to produce the middleware (MW). The middleware may be provided to the production build subprocess 470.

The production build subprocess 470 has three required inputs: the UI program, the middleware, and the backend. At S472, the production build subprocess 470 receives the UI program, the middleware, and the backend, then integrates them into a production build. The production build subprocess 470 then tests the production build. In an embodiment, the production build subprocess 470 tests the production build using a database including data, provided by the UI development process 410 using an automated process, that was used by the Fake BE.

At S474, the production build subprocess 470 proceeds to S476 if the tests performed at S472 passed; otherwise, at S474 the production build subprocess 470 proceeds to S478.

At S476, the production build subprocess 470 ships the successfully tested production build.

At S478, the production build subprocess 470 analyzes the failures that occurred at S472, and communicates the analysis results back to one or more of the other subprocesses. The appropriate subprocess or subprocesses are then performed again to remedy the failures.

Embodiments of the present disclosure include electronic devices configured to perform one or more of the operations described herein. However, embodiments are not limited thereto. Embodiments of the present disclosure may further include systems configured to operate using the processes described herein.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and so on. The program instructions may be adapted to execute the processes described herein.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

In some cases, an embodiment of the invention may be an apparatus that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

Figure 5:
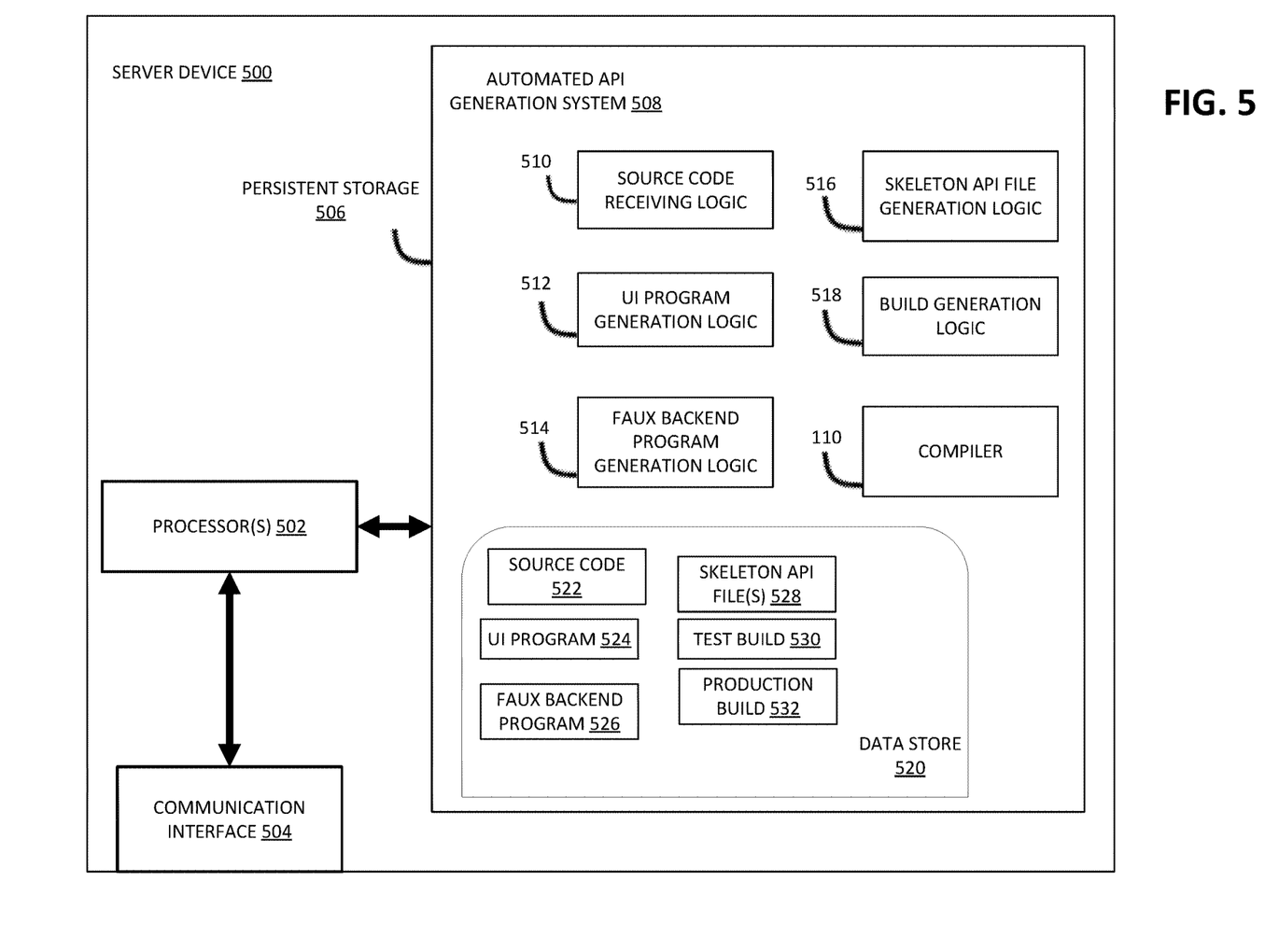
FIG. 5 illustrates an exemplary embodiment of a logical representation of an automated API generation system, according to an embodiment of the disclosure.

Referring now to FIG. 5, an exemplary embodiment of a logical representation of an automated API generation system is shown. The automated API generation system 508, in an embodiment, may be stored on a non-transitory computer-readable storage medium of server device 500 that includes a housing, which may be made entirely or partially of a hardened material (e.g., hardened plastic, metal, glass, composite or any combination thereof) that protects the circuitry within the housing, namely one or more processors 502 that are coupled to a communication interface 504. The communication interface 504, in combination with a communication interface logic, enables communications with external network devices or other network appliances. According to one embodiment of the disclosure, the communication interface 504 may be implemented as a physical interface including one or more ports for wired connectors. Additionally, or in the alternative, the communication interface 504 may be implemented with one or more radio units for supporting wireless communications with other electronic devices. The communication interface logic may include logic for performing operations of receiving and transmitting one or more objects via the communication interface 504 to enable communication between the server device 500 and network devices via a network (e.g., the internet) or cloud computing services, not shown.

The processor(s) 502 is further coupled to a persistent storage 506. According to one embodiment of the disclosure, the persistent storage 506 may include the following logic as software modules: a source code receiving logic 510, a UI program generation logic 812, a faux backend program generation logic 514, a skeleton API data generation logic 516, a build generation logic 518 and the compiler 110. Additionally, the persistent storage 506 includes a data store 520 that is in communication with the logic modules stored in the persistent storage 506 and is configured to store source code 522, a UI program 524, a faux backend program 526, a skeleton API data(s) 528, a test build 530, and a production build 532. The operations of these software modules, upon execution by the processor(s) 502, are described above. Of course, it is contemplated that some or all of this logic may be implemented as hardware, and if so, such logic could be implemented separately from each other.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A computer-implemented method, comprising:
    receiving entry files including source code and configuration data, wherein the source code is for a user interface program, wherein the source code includes a plurality of Application Programming Interface (API) calls, and wherein the configuration data includes a definition for each of the plurality of API calls;
    generating the user interface program by a complier configured to compile the source code, wherein the user interface program includes executable code; and
    generating skeleton API data based on definitions of the plurality of API calls included in the configuration data, wherein the skeleton API data comprises a set of rules generated by the compiler, wherein the set of rules define a structure for the each of the plurality of API calls used by the user interface program, wherein the structure for the each of the plurality of API calls includes syntax and semantics to be used by a middleware program when interfacing with the user interface program.

2. The computer-implemented method of claim 1, wherein the compiler performs operations of receiving the source code, generating the user interface program and generating the skeleton API data.

3. The computer-implemented method of claim 1, wherein generating the skeleton API data includes operations, performed by a compiler, of:
    parsing the configuration data,
    extracting a definition of the each of the plurality of API calls within the configuration data, where the definition of the each of the plurality of API calls comprises a unique identifier and a data parameter indicating data returned by the each of the plurality of API calls, and
    populating a data store with the definition of the each of the plurality of API calls.

4. The computer-implemented method of claim 1, wherein the skeleton API data includes at least one of: (i) a name corresponding to the each of the plurality of API calls, (ii) a description of the each of the plurality API calls, (iii) a listing of HyperText Transfer Protocol (HTTP) request methods that the each of the plurality of API calls supports, or (iv) a set of properties for the each of the plurality of API calls.

5. The computer-implemented method of claim 4, wherein a first property of the set of properties for an API call includes at least a name of the first property, a description of the first property, and an indication as to whether the first property is a required property for the API call.

6. The computer-implemented method of claim 4, wherein the skeleton API data includes an indication for one or more locations at which the skeleton API data is stored such that the user interface program accesses a location of the skeleton API data via the API calls.

7. A non-transitory computer readable medium comprising logic instructions, that when executed by a processor, cause operations including:
    receiving entry files including source code and configuration data, wherein the source code is for a user interface program, wherein the source code includes a plurality of Application Programming Interface (API)

calls, and wherein the configuration data includes a definition for each of the plurality of API calls;

generating the user interface program by a complier configured to compile the source code, wherein the user interface program includes executable code; and generating skeleton API data based on definitions of the plurality of API calls included in the configuration data, wherein the skeleton API data comprises a set of rules generated by the compiler, wherein the set of rules define a structure for the each of the plurality of API calls used by the user interface program, wherein the structure for the each of the plurality of API calls includes syntax and semantics to be used by a middleware program when interfacing with the user interface program.

8. The non-transitory computer readable medium of claim 7, wherein the compiler performs operations of receiving the source code, generating the user interface program and generating the skeleton API data.

9. The non-transitory computer readable medium of claim 7, wherein generating the skeleton API data includes operations, performed by a compiler, of:

parsing the configuration data, extracting a definition of the each of the plurality of API calls within the configuration data, where the definition of the each of the plurality of API calls comprises a unique identifier and a data parameter indicating data returned by the each of the plurality of API calls, and populating a data store with the definition of the each of the plurality of API calls.

10. The non-transitory computer readable medium of claim 7, wherein the skeleton API data includes at least one of: (i) a name corresponding to the each of the plurality of API calls, (ii) a description of the each of the plurality of API calls, (iii) a listing of HyperText Transfer Protocol (HTTP) request methods that the each of the plurality of API calls supports, or (iv) a set of properties of the each of the plurality of API calls.

11. The non-transitory computer readable medium of claim 10, wherein a first property of the set of properties of a first API call of the plurality of API calls includes at least a name of the first property, a description of the first property, and an indication as to whether the first property is a required property for the first API call.

12. A system comprising:

one or more processors; and a non-transitory computer readable medium having logic instructions stored thereon that, when executed by the one or more processors, causes performance of operations including:

receiving entry files including source code and configuration data, wherein the source code is for a user interface program, wherein the source code includes a plurality of Application Programming Interface (API) calls, and wherein the configuration data includes a definition for each of the plurality of API calls;

generating the user interface program by a complier configured to compile the source code, wherein the user interface program includes executable code; and generating skeleton API data based on definitions of the plurality of API calls included in the configuration data, wherein the skeleton API data comprises a set of rules generated by the compiler, wherein the set of rules define a structure for each API call of the plurality of API calls used by the user interface program, wherein the structure for the each of the plurality of API calls includes syntax and semantics to be used by a middleware program when interfacing with the user interface program.

13. The system of claim 12, wherein the compiler performs operations of receiving the source code, generating the user interface program and generating the skeleton API data.

14. The system of claim 12, wherein generating the skeleton API data includes operations, performed by the compiler, of:

parsing the configuration data, extracting a definition of each API call within the configuration data, where the definition of the each of the plurality API calls comprises a unique identifier and a data parameter indicating data returned by the each of the plurality API calls, and populating a data store with the definition of the each of the plurality API calls.

* * * * *